United States Patent [19]

Diamontis

[11] Patent Number: 4,625,415

[45] Date of Patent: Dec. 2, 1986

[54] STUD SPACER

[76] Inventor: Damon Diamontis, 520 Mt. Auburn St., Watertown, Mass. 02172

[21] Appl. No.: 705,713

[22] Filed: Feb. 26, 1985

[51] Int. Cl.⁴ .................................................. G01B 3/30

[52] U.S. Cl. ..................................... 33/180 R; 33/562

[58] Field of Search ............... 33/562, 180 R; 269/40, 269/41, 157, 904, 914

[56] References Cited

U.S. PATENT DOCUMENTS 2,567,586 9/1951 Werder ............................ 269/40 X 2,575,595 11/1951 Rienecker ......................... 33/562 X 2,911,022 11/1959 Brown .......................... 33/180 R X 3,126,928 3/1964 McMillan ......................... 33/180 R 3,963,230 6/1976 Jankowski ............................ 269/41

*Primary Examiner*—Harry N. Haroian

*Attorney, Agent, or Firm*—Robert T. Gammons

[57] ABSTRACT

A stud spacer for construction work comprising a rigid support to which spacers are fixed at longitudinally-spaced intervals corresponding to the distance between studs to hold the latter at the desired spacing while the studs are being secured.

7 Claims, 4 Drawing Figures

STUD SPACER

BACKGROUND OF THE INVENTION

Devices for securing studs in spaced relation during construction and holding them at the desired spacing while they are being secured are disclosed in U.S. Pat. Nos. 3,834,033; 3,456,702; 3,169,320; 2,911,022; and 2,567,586.

The stud spacer of the instant invention is considered to constitute an improvement over the structure shown in the aforesaid patents in that it is of simpler design, easier to use, and less expensive to manufacture.

SUMMARY OF THE INVENTION

The stud spacer as herein illustrated comprises a rigid elongate support, longitudinally-spaced dividers fixed at one end to one side of the support at right angles thereto, the spaces between dividers corresponding to the distance between the studs and means for anchoring the spacer to the structure to which the studs are to be secured, said support containing sight openings adjacent the dividers to enable positioning the spacer on centers corresponding to the center-to-center specifications required by the building code. There are longitudinally-spaced second supports fixed to the respective opposite ends of the dividers providing support for said ends. The dividers and first and second supports define open-sided recesses of rectangular horizontal section disposed with the open sides facing in the same direction for receiving the lower ends of the studs. There are anchor members adjacent each divider fixed between the first and second supports containing holes for receiving fastening elements to secure the spacer while in situ to the structure to which the studs are being secured. The lower edges of the dividers and the undersides of the anchoring members are spaced above the lower edges of the supports such that portions of the supports below the dividers and the anchoring members define spaced, parallel flanges for engagement with the sides of the structure to which the studs are to be secured. The lower edges of the supports are rectilinear and lie in a corresponding plane parallel to the planar surface of the anchoring members.

The invention will now be described with reference to the accompanying drawings, wherein.

Figure 1:
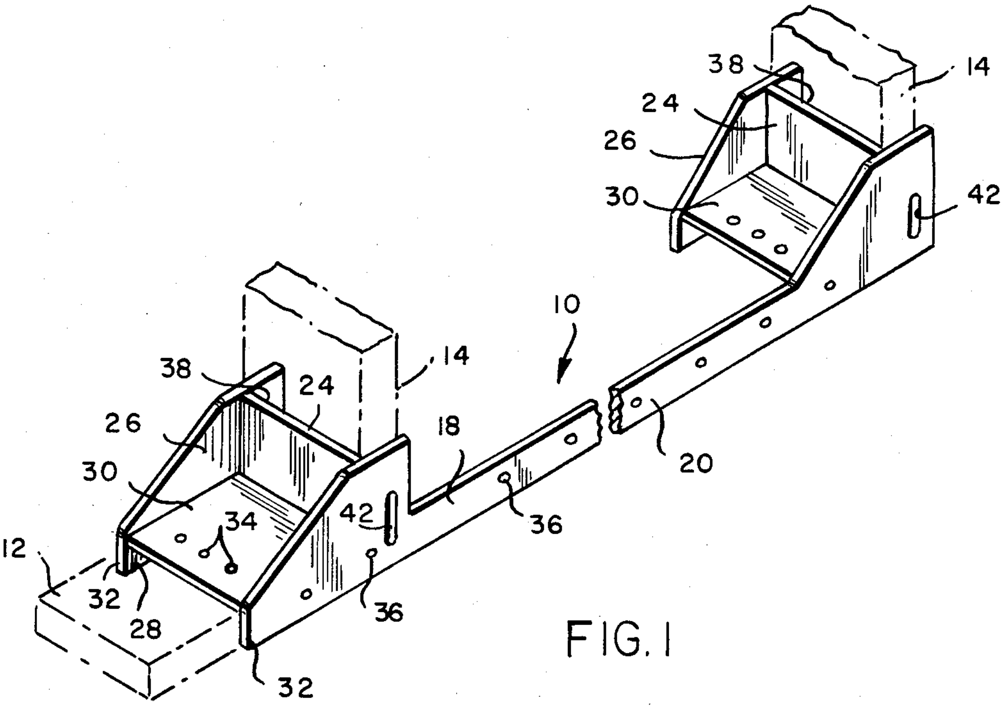
FIG. 1 is a perspective view of a stud spacer broken away in part showing two stud engaging elements.
Figure 2:
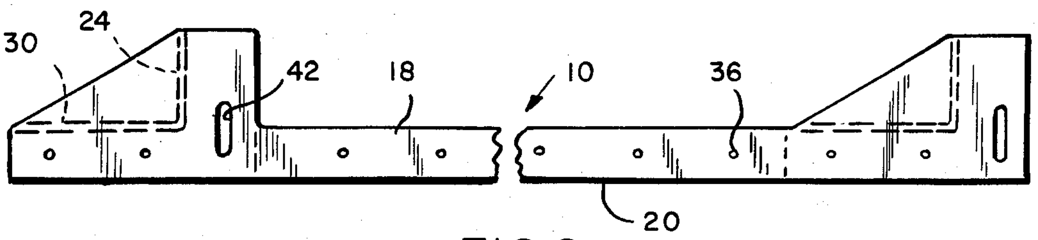
FIG. 2 is an elevation taken at the front side of FIG. 1.
Figure 3:
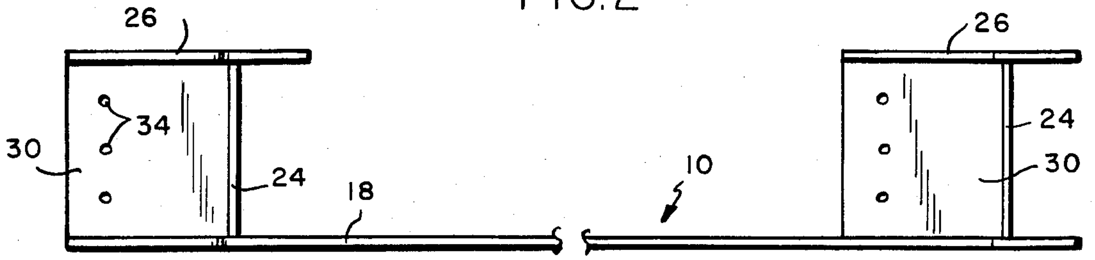
FIG. 3 is a plan view.
Figure 4:
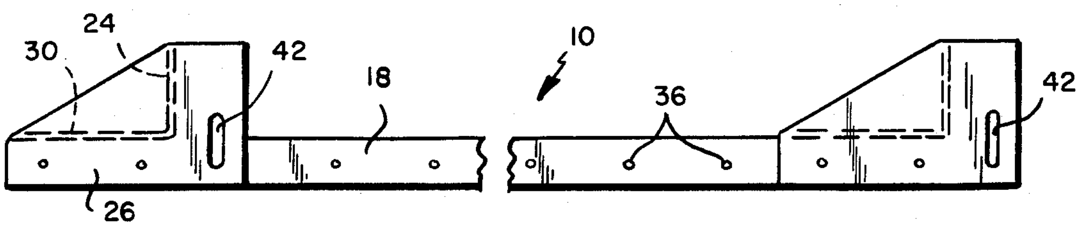
FIG. 4 is an elevation of the backside of FIG. 2.

As shown in FIG. 1, the spacer 10 is structured to be applied to a floor stringer 12 upon which are to be erected studs 14. The spacer 10 comprises a rigid, elongate support 18 having a rectilinear lower edge 20. At longitudinally-spaced intervals, there are dividers 24 which extend at right angles thereto. At opposite ends of the respective dividers, there are supports 26, the lower edges 28 of which lie in the same plane as the lower edge 20 of the support 18. Supports 18 and 26 collectively support the dividers 24 in rigidly-spaced relation to each other.

Intermediate the supports 18 and 26, there are horizontal anchor plates 30 which are secured at their opposite edges to the supports 18 and 26 and at one end to the lower edges of the dividers 24.

The anchor plates 30 at the lower edges of the divider are spaced above the lower edges 20 and 28 a distance such as to provide transversely-spaced flanges 32—32 for engagement with the opposite sides of the floor stringer 12. The anchor plates 30 are provided with holes 34 for receiving fastening elements, for example, nails, to anchor the spacer to the floor member. Holes 36 are also provided at spaced intervals along the support 18 for receiving nails for anchoring the structure to the floor stringer.

The dividers 24, in conjunction with the supports 18 and 26, define open-sided recesses 38 of rectangular horizontal section dimensioned to engage the edges and one side of the studs 14. The support 18 also contains vertically-elongate slots 42 adjacent the dividers which constitute windows to enable positioning the spacers on centers at the center-to-center distance specified by the building code.

By structuring the spacer so that the dividers 24 are connected to the support 18 at one end only so that there are gaps between the dividers at the opposite ends, the spacer can be removed after the studding is secured.

While the spacer is designed to enable placing it astride a floor member 12, it can, of course, be placed on a flat surface and anchored in place by driving nails through the openings 34.

From a practical standpoint, the spacer is comprised of metal for durability; however, it is within the scope of the invention to make the spacer of a rigid plastic or of wood.

Further, while the spacer is illustrated as being used for securing the lower ends of studs to floor joists, it can be used for spacing the upper ends of studs to ceiling joists whether disposed perpendicularly or horizontally so that it can be used not only for vertical partitions, but for horizontal partitions.

What is claimed is:

1. A stud spacer comprising a rigid, elongate first support, longitudinally-spaced dividers fixed at one end to one side of said first support at right angles thereto, the spaces between dividers corresponding to the distance between studs and means for anchoring the spacer to the structure to which the studs are to be secured, said elongate support containing sight openings adjacent the dividers, the distance between sight openings and longitudinally-spaced second supports fixed to the respective opposite ends of te dividers providing support for said ends corresponding to the on center spacing required by the building code and an anchor member adjacent each divider fixed to said elongate support and said second supports, containing holes for receiving fastening means to secure the spacer.

2. A stud spacer according to claim 1 wherein the lower edge of the dividers and the undersides of the anchor members are situated above the lower edges of the supports so that portions of the supports below the dividers and the anchor members define spaced, parallel flanges for engagement with the sides of the structure to which the studs are to be secured.

3. A stud spacer according to claim 2 wherein the lower edges of the supports are rectilinear and spaced from and parallel to the plane of the anchor members to thus support the spacer on a plane surface.

4. A stud spacer structure comprising spaced, parallel first and second means, said first means being continuous and said second means being discontinuous and third means secured between the first and second means and defining therewith longitudinally-spaced recesses open at one side facing in the same direction and of a cross section configured to receive the lower ends of the studs, said third means containing holes for receiving fastening elements to anchor the spacer to the structure to which the studs are to be secured and said first means containing sight holes positioning the spacer according to the building code.

5. A stud spacer according to claim 4 wherein the longitudinally-spaced recesses are of rectangular horizontal section.

6. A stud spacer according to claim 4 wherein the recesses are of rectangular horizontal section.

7. A stud spacer according to claim 4 wherein the third means is spaced upwardly from the lower edges of the first and second means.

* * * * *